(12) United States Patent
Okada et al.

(10) Patent No.: US 9,134,002 B2
(45) Date of Patent: Sep. 15, 2015

(54) VEHICLE LIGHTING UNIT

(75) Inventors: Hidetaka Okada, Tokyo (JP); Hiroyuki Takahashi, Tokyo (JP); Kazuya Makiuchi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 409 days.

(21) Appl. No.: 13/475,932

(22) Filed: May 18, 2012

(65) Prior Publication Data

US 2012/0294030 A1    Nov. 22, 2012

(30) Foreign Application Priority Data

May 18, 2011    (JP) .................. 2011-111037

(51) Int. Cl.
| | |
|---|---|
| B60Q 1/26 | (2006.01) |
| F21S 8/10 | (2006.01) |
| B60R 1/06 | (2006.01) |
| B60R 1/12 | (2006.01) |

(52) U.S. Cl.
CPC .............. F21S 48/215 (2013.01); B60Q 1/2665 (2013.01); B60R 1/06 (2013.01); B60R 1/1207 (2013.01); F21S 48/225 (2013.01); F21S 48/2237 (2013.01); F21S 48/2281 (2013.01)

(58) Field of Classification Search
USPC ........................................ 362/487, 494, 498
See application file for complete search history.

(56) References Cited

U.S. PATENT DOCUMENTS

| | | |
|---|---|---|
| 2003/0035299 A1 | 2/2003 | Amano |
| 2006/0146555 A1 | 7/2006 | Inaba |
| 2009/0073709 A1 | 3/2009 | Yajima et al. |

FOREIGN PATENT DOCUMENTS

| | | |
|---|---|---|
| JP | 2003-59313 A | 2/2003 |
| JP | 2005-327649 A | 11/2005 |
| JP | 2006-164908 A | 6/2006 |
| JP | 2008-100653 A | 5/2008 |
| JP | 2010-100081 A | 5/2010 |

OTHER PUBLICATIONS

Japanese Office Action for the related Japanese Patent Application No. 2011-111037 dated Feb. 3, 2015.

*Primary Examiner* — Mariceli Santiago
*Assistant Examiner* — Brenitra M Lee
(74) *Attorney, Agent, or Firm* — Kenealy Vaidya LLP

(57) ABSTRACT

A vehicle lighting unit can be configured such that it is difficult or impossible for an observer to visually recognize a light source, a light guide and the like through an outer lens and to suppress brightness unevenness. The vehicle lighting unit can project light outwardly through an opening portion formed in a mirror housing of a sideview mirror along a vehicle length direction and near an outer side of the sideview mirror in a vehicle width direction. The vehicle lighting unit can include: a housing provided inside the mirror housing, an outer lens inside the mirror housing so as to close the opening portion, a light source disposed in a lighting chamber at a position vertically shifted from the position of the opening portion, and a light guide disposed in the lighting chamber while shifted from the position of the opening portion toward the light source.

18 Claims, 7 Drawing Sheets

VEHICLE LIGHTING UNIT

This application claims the priority benefit under 35 U.S.C. §119 of Japanese Patent Application No. 2011-111037 filed on May 18, 2011, which is hereby incorporated in its entirety by reference.

TECHNICAL FIELD

The presently disclosed subject matter relates to a vehicle lighting unit such as a vehicle signal light.

BACKGROUND ART

Japanese Patent Application Laid-Open No. 2006-164908 discloses a vehicle signal light attached to a vehicle sideview mirror. The vehicle signal light is a lighting unit including a turn indicator light and a daytime running light integrated with each other. The daytime running light can be configured such that an LED and a light guide are installed within a lighting chamber defined by a housing main body and an outer lens. The outer lens and the housing main body can be attached to the inside of a housing of the sideview mirror, and a horizontally long opening portion can be formed in the front face of the housing of the sideview mirror. Then, the outer lens can be partly fit to the opening portion. The light guide can face to the opening portion so as to extend along the opening portion in the right-to-left direction. The LED can be face to the incident surface of the light guide at one end thereof in the longitudinal direction. When the LED is lit, the light emitted from the LED can exit through the light exiting surface of the light guide as a surface light source (surface-shaped emission light), and the light can be projected outwardly through the outer lens.

Japanese Patent Application Laid-Open No. 2008-100653 also discloses a vehicle signal light attached to a sideview mirror. In this vehicle signal light, a partition wall can be installed within a light chamber defined by a housing main body and an outer lens, so that the light chamber can be divided into a space on the outer lens side and a space on the housing main body side by the partition wall. A plurality of LEDs can be accommodated in the space on the housing main body side. Further, a plurality of openings can be formed in the partition wall. A reflecting wall portion can extend from part of the edge of the opening in the partition wall on the outer lens side, so that the reflecting wall portion can cover the opening. The tip end of the reflecting wall portion can be separated away from the surface of the partition wall on the outer lens side. A reflecting surface can be formed on the surface of the reflecting wall portion on the partition wall side. When the LEDs are lit, the light emitted from the LEDs can pass through the openings and be reflected by the reflecting surface, thereby being projected outwardly through the outer lens.

In the daytime running light described in Japanese Patent Application Laid-Open No. 2006-164908, when the LED is turned off, an observer can observe the light guide through the outer lens, whereby the outer appearance may deteriorate. In addition, when the LED is lit, the light exiting surface of the light guide can be brighter at a region near the LED and become darker away from that region near the LED.

In the vehicle signal light described in Japanese Patent Application Laid-Open No. 2008-100653, when the LEDs are turned off, an observer cannot see the LEDs but can observe the partition wall and the reflecting wall portion, whereby the outer appearance may deteriorate.

SUMMARY

The presently disclosed subject matter was devised in view of these and other problems and features and in association with the conventional art. According to an aspect of the presently disclosed subject matter, there is provided a vehicle signal light configured such that it is difficult or impossible for an observer to visually recognize a light source, a light guide and the like through an outer lens and can suppress the brightness unevenness of the emission light.

According to another aspect of the presently disclosed subject matter, a vehicle lighting unit can project light outwardly through an opening portion formed in a mirror housing of a sideview mirror along a vehicle length direction and near an outer side of the sideview mirror in a vehicle width direction. The vehicle lighting unit can include: a housing having a light-blocking property and extending along the opening portion of the mirror housing inside the mirror housing and opening toward the opening portion of the mirror housing; an outer lens assembled with the housing inside the mirror housing so as to close the opening of the housing and the opening portion of the mirror housing, the outer lens and the housing defining a lighting chamber; a light source disposed in the lighting chamber at a position shifted from the position of the opening portion of the mirror housing in one vertical direction (vehicle height direction) and having an optical axis in the other vertical direction; and a light guide disposed in the lighting chamber while shifted from the position of the opening portion of the mirror housing toward the light source so as to convert the light emitted from the light source to surface-shaped emission light through a light exiting surface thereof in a direction of the optical axis. In this vehicle lighting unit, the light source and the light guide cannot be seen (i.e., the light source and/or light guide are difficult or impossible to be seen) through the opening portion of the mirror housing from a front side thereof.

Further, according to another aspect of a vehicle lighting unit, a diffusing and reflecting surface configured to diffuse and reflect light projected from the light exiting surface of the light guide toward the outer lens and the opening portion of the mirror housing can be formed in part of an inner surface of the housing that faces to the light exiting surface of the light guide.

Further, according to another aspect of a vehicle lighting unit, the light exiting surface of the light guide can project light emitted from the light source to an inner surface of the housing so that the light is diffused, and a reflecting surface configured to reflect, or diffuse and reflect, light projected from the light exiting surface of the light guide toward the outer lens and the opening portion of the mirror housing can be formed in part of the inner surface of the housing that faces towards the light exiting surface of the light guide.

Still further, according to another aspect of a vehicle lighting unit, a reflecting surface configured to reflect, or diffuse and reflect, light projected from the light exiting surface of the light guide toward the outer lens and the opening portion of the mirror housing can be formed in part of an inner surface of the housing that faces to the light exiting surface of the light guide, and the outer lens can be configured to diffuse the light reflected or diffused and reflected by the reflecting surface and to allow the light to pass therethrough.

According to another aspect of the presently disclosed subject matter, a vehicle lighting unit can project light outwardly through an opening portion formed in a mirror housing of a sideview mirror along a vehicle length direction and near an outer side of the sideview mirror in a vehicle width direction. The vehicle lighting unit can include: a housing having a light-blocking property and extending along the opening portion of the mirror housing inside the mirror housing and opening toward the opening portion of the mirror housing; an outer lens assembled with the housing inside the mirror housing so as to close the opening of the housing and the opening portion of the mirror housing, the outer lens and the housing defining a lighting chamber; and a light source disposed in the lighting chamber at a position shifted from the position of the opening portion of the mirror housing in one vertical direction (vehicle height direction) and having an optical axis in the other vertical direction. In this vehicle lighting unit, the light source cannot be seen through the opening portion of the mirror housing from a front side thereof.

Further, according to another aspect of a vehicle lighting unit, a diffusing and reflecting surface configured to diffuse and reflect light projected from the light source in a direction of the optical axis thereof toward the outer lens and the opening portion of the mirror housing can be formed in part of an inner surface of the housing where the optical axis of the light source crosses.

Still further, according to another aspect of a vehicle lighting unit, a reflecting surface configured to reflect, or diffuse and reflect, light projected from the light source in a direction of the optical axis thereof toward the outer lens and the opening portion of the mirror housing can be formed in part of an inner surface of the housing where the optical axis of the light source crosses, and the outer lens can be configured to diffuse the light reflected or diffused and reflected by the reflecting surface and to allow the light to pass therethrough.

Further, any of the above described vehicle lights can be configured as a vehicle signal light, position light, fog light, general vehicle light, etc.

According to the presently disclosed subject matter, since the light source and the light guide can be shifted from the opening portion of the mirror housing in the vertical direction (vehicle height direction), an observer cannot observe the light source and the light guide through the opening portion of the mirror housing and the outer lens, thereby maintaining or improving the outer appearance of the vehicle lighting unit, such as a vehicle signal light.

In addition, brightness unevenness can be suppressed by the diffusion and reflection of light by the reflecting surface or by the light exiting surface of the light guide, or the diffusion and passage of light by the outer lens.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units and vehicle signal lights of the presently disclosed subject matter with reference to the accompanying drawings in accordance with exemplary embodiments. Herein, the directions including upper, lower, front, rear, right and left directions as well as vertical (vehicle height) and horizontal (vehicle width) directions may be defined on the basis of the corresponding directions of a vehicle body while assuming that the vehicle lighting unit is installed on the vehicle body.

Figure 1:
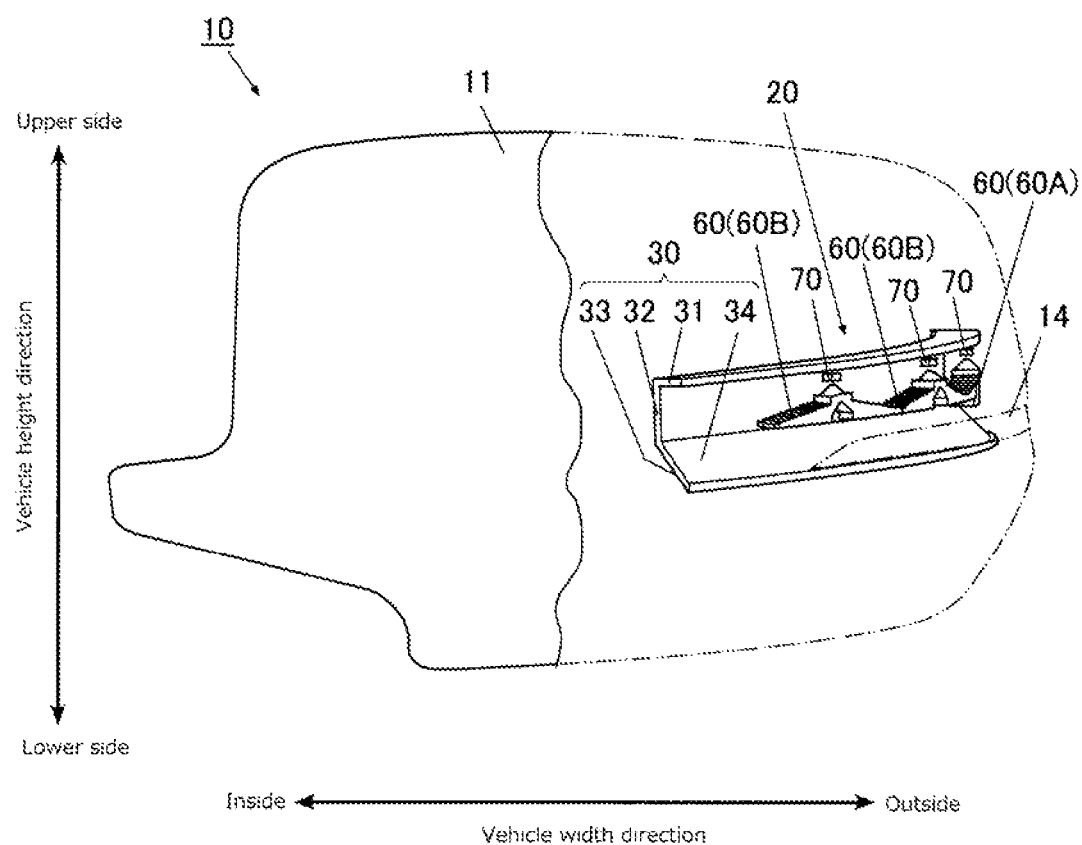
FIG. 1 is a front view of a sideview mirror to which a vehicle signal light according to an exemplary embodiment made in accordance with principles of the presently disclosed subject matter is attached.
Figure 2:
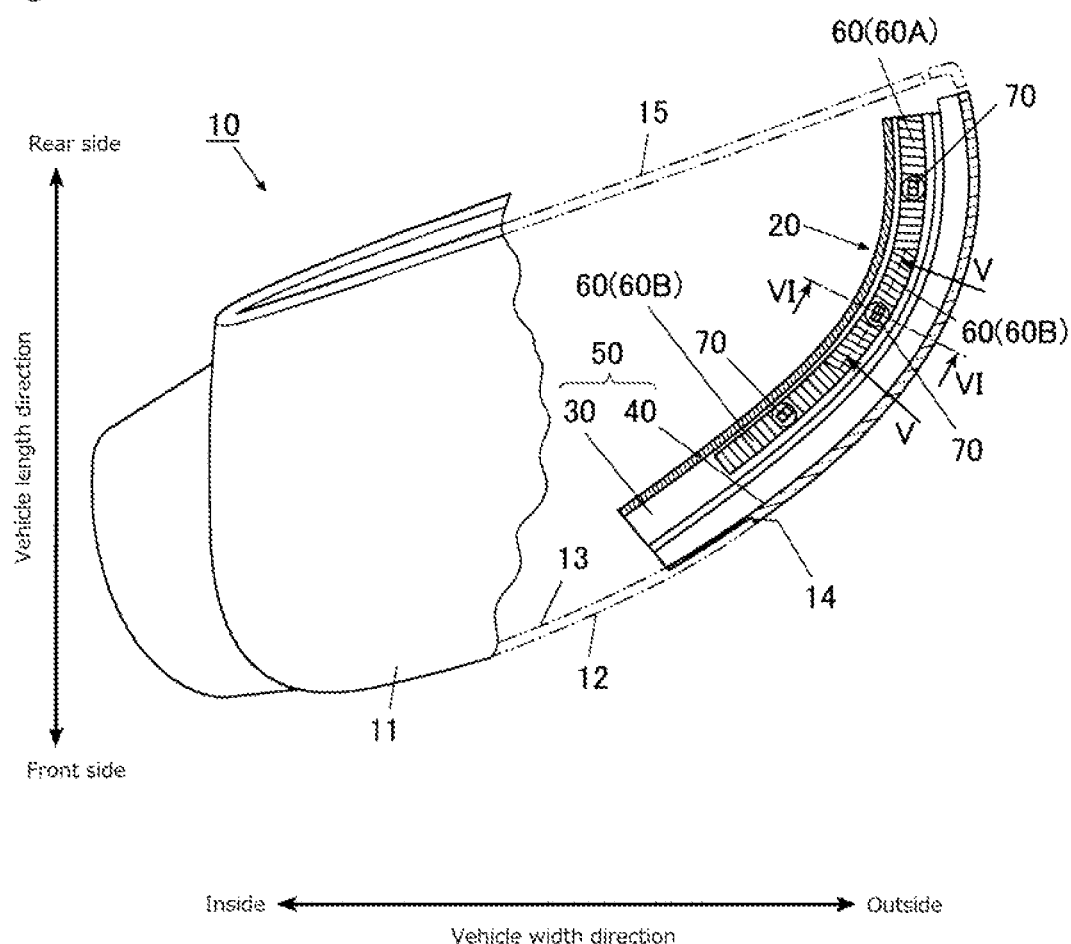
FIG. 2 is a top view of the sideview mirror.
Figure 3:
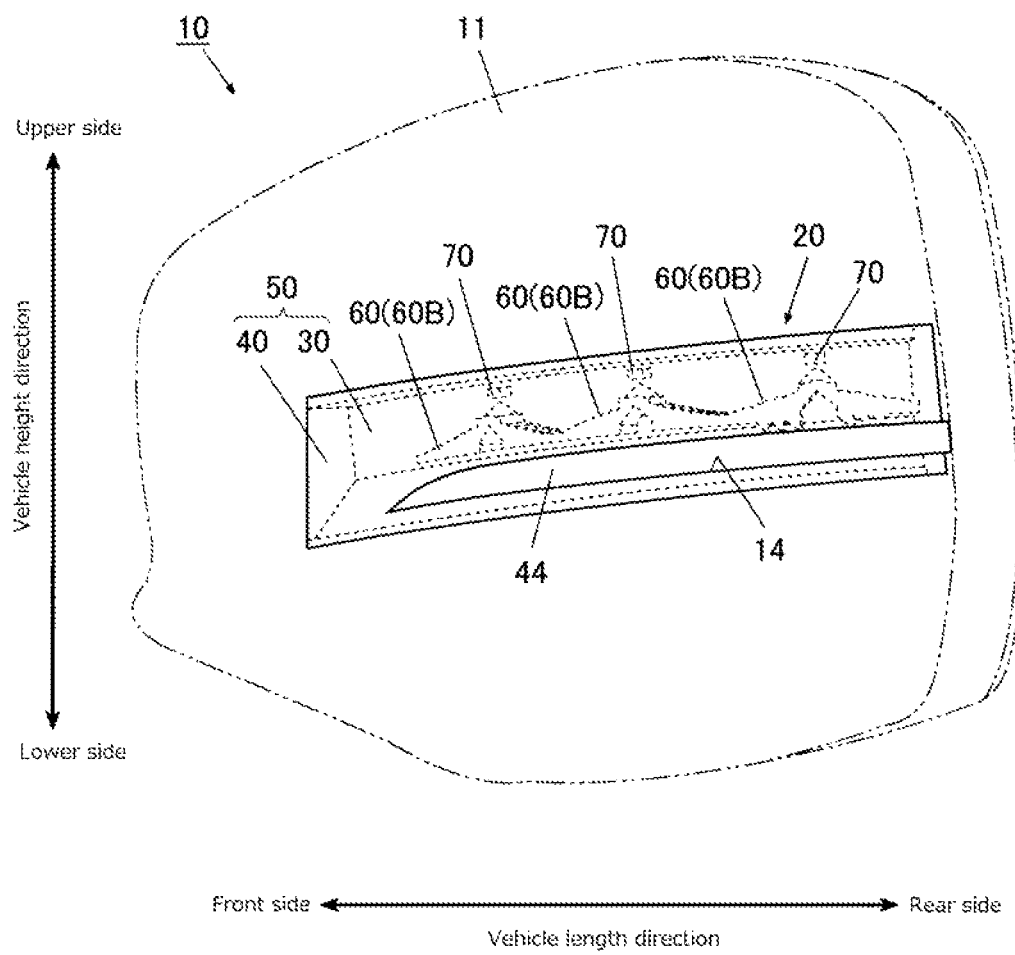
FIG. 3 is a side view of the sideview mirror.
Figure 4:
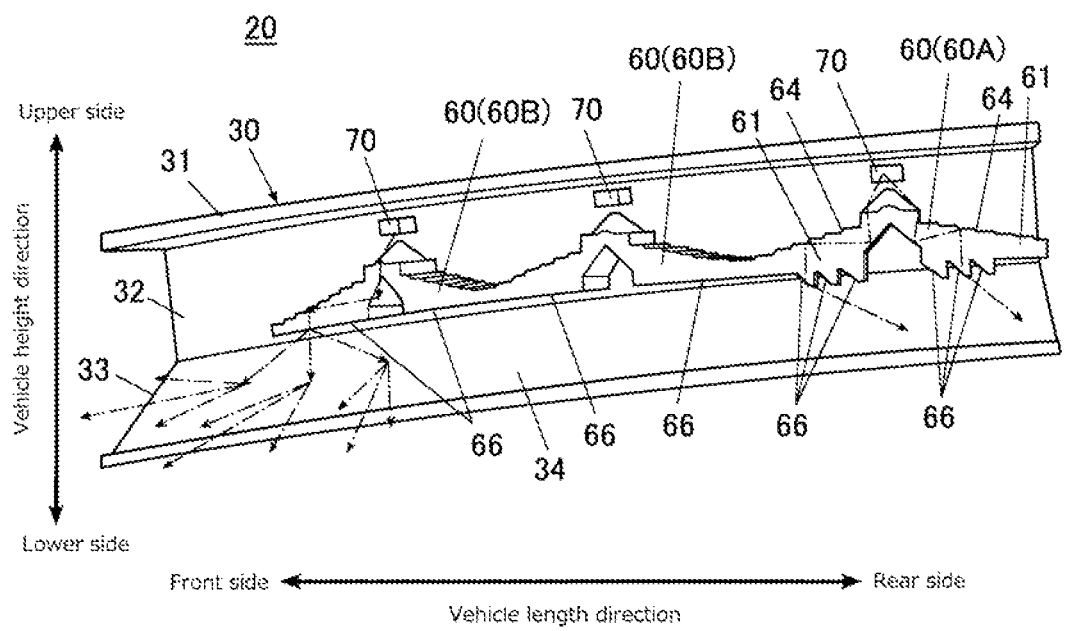
FIG. 4 is a side view of the vehicle signal light.
Figure 5:
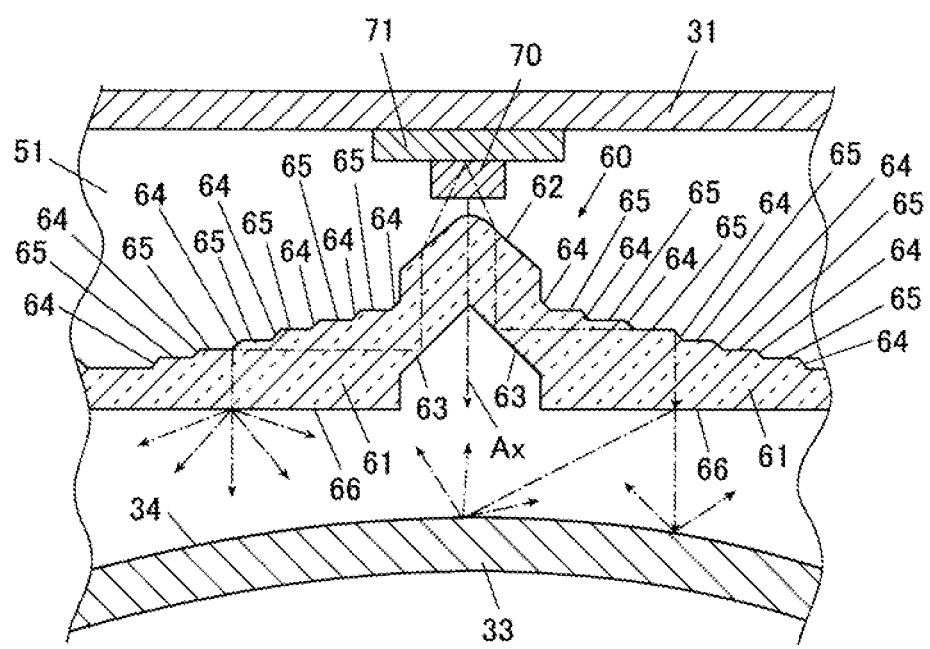
FIG. 5 is a cross-sectional view of the sideview mirror of FIG. 2 taken along line V-V.

FIGS. 1, 2, and 3 are a front view, a top view and a side view of a sideview mirror 10, respectively. FIG. 4 is a side view of a vehicle signal light 20 attached to the sideview mirror 10, FIG. 5 is a cross-sectional view of the sideview mirror of FIG. 2 taken along line V-V when viewed from the arrow, and FIG. 6 is a cross-sectional view of the sideview mirror of FIG. 2 taken along line VI-VI when viewed from the arrow.

As shown in FIGS. 1 to 3, the sideview mirror 10 can be a door mirror attached to a vehicle door. The sideview mirror 10 can include a mirror housing 11 in a cup shape and having a rear opening, and a mirror main body 15 provided at the rear opening inside the mirror housing 11. The front outer surface 12 of the mirror housing 11 can be formed to be curved in a convex shape and can have an opening portion 14 extending outward in the vehicle width direction (right-to-left direction). The opening portion 14 can extend in the vehicle length direction (front-to-rear direction) so as to be elongated in the vehicle length direction. The length of the opening portion 14 along the vehicle length direction is therefore longer than the width thereof in the vehicle height direction (vertical direction). Then, the vehicle signal light 20 can be attached inside the mirror housing 11 so as to be exposed at the opening portion 14 in part.

The vehicle signal light 20 can include a housing 30, an outer lens 40, a plurality of light guides 60, a plurality of light sources 70, and the like. In FIGS. 1 to 4, the outer lens 40 may be omitted in order to detail the inside of a box 50.

Figure 6:
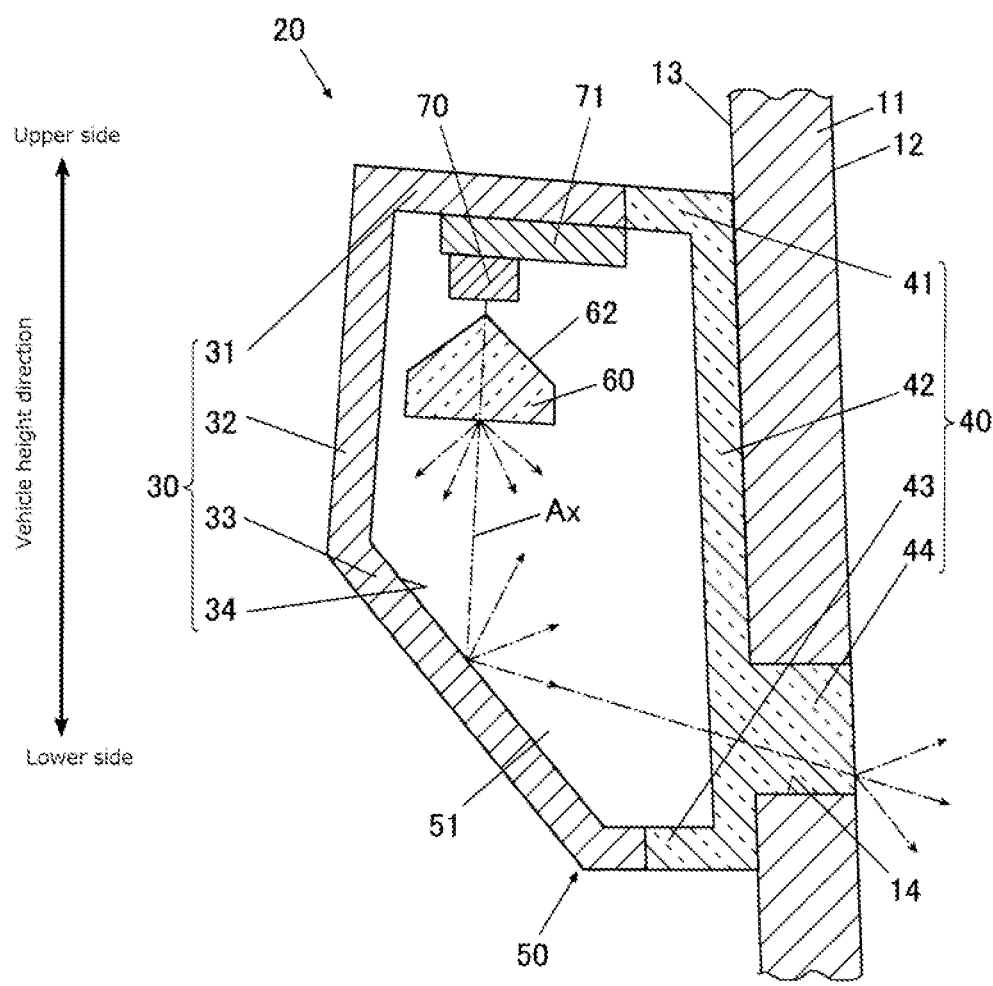
FIG. 6 is a cross-sectional view of the sideview mirror of FIG. 2 taken along line VI-VI.

As shown in FIGS. 2, 3 and 6, the housing 30 and the outer lens 40 can be assembled to constitute the box 50. Accordingly, a lighting chamber 51 can be defined by the housing 30 and the outer lens 40.

The box 50, being an assembly of the housing 30 and the outer lens 40, can be curved along the opening portion 14 of the mirror housing 11. Accordingly, the lighting chamber 51 can also be curved and elongated along the opening portion 14 in the right-to-left direction.

As shown in FIGS. 1 to 3, the housing 30 can have a light-blocking property and extend inside the mirror housing 11 along the opening portion 14. As shown in FIGS. 1, 4, and 6, the housing 30 can have a cross section in a letter-U shape in a plane perpendicular to the extending direction of the housing 30 so that the opening of the housing 30 is directed to the opening portion 14. Specifically, as shown in FIG. 6, the housing 30 can include a top plate 31, a side plate 32, an inclined plate 33 and a reflecting surface 34.

The side plate 32 can be positioned above (higher than) the position of the opening portion 14 and extend along the opening portion 14 within the mirror housing 11. Specifically, the side plate 32 can be curved along the inner surface 13 of the mirror housing 11 and face to the part of the inner surface 13 above the opening portion 14.

The top plate 31 can be positioned above (higher than) the position of the opening portion 14 and extend outwardly from the upper end of the side plate 32 toward the mirror housing 11.

The inclined plate 33 can extend outwardly from the lower end of the side plate 32 toward the mirror housing 11. The inclined plate 33 and the top plate 31 may not be parallel to each other, but the inclined plate 33 can be inclined downwardly extending toward the opening portion 14. The vertical position of the inclined plate 33 can be matched or aligned with respect to the vertical position of the opening portion 14 within the mirror housing 11.

The reflecting surface 34 can be formed in the top surface of the inclined plate 33 so that the vertical position of the reflecting surface 34 can be matched to the vertical position of the opening portion 14. Accordingly, the reflecting surface 34 can be inclined downwardly toward the opening portion 14. In other words, the reflecting surface 34 can constitute the lower surface of the inner surface of the housing 30. The reflecting surface 34 may cross the optical axis Ax of the light source 70 and face towards the light exiting surfaces 66 of the light guide 60. The reflecting surface 34 can be configured to reflect light emitted from the light guide 60 toward the opening portion 14 of the mirror housing 11.

As shown in FIGS. 2, 3, and 6, the outer lens 40 can extend inside the mirror housing 11 along the opening portion 14. The housing 30 can have a cross section in a letter-U shape in a plane perpendicular to the extending direction of the outer lens 40 so that the opening of the outer lens 40 is directed opposite to the opening portion 14. The outer lens 40 and the housing 30 can be assembled so that the opening between the top plate 31 and the inclined plate 33 of the housing 30 and the opening of the outer lens 40 face to and are overlapped with each other and thereby the opening between the top plate 31 and the inclined plate 33 of the housing 30 can be closed by the outer lens 40. Namely, the outer lens 40 can be disposed closer to the mirror housing 11 than the housing 30 within the mirror housing 11. In the vehicle signal light as well as in other applications, the outer lens 40 can be formed from a transparent material.

As shown in FIG. 6, the outer lens 40 can include a top plate 41, a side plate 42, a bottom plate 43, and a fit convex portion 44 which can be integrally formed from a single piece of transparent material.

The side plate 42 can extend along the opening portion 14 inside the mirror housing 11 and can be curved along the inner surface 13 of the mirror housing 11. The side plate 42 can be configured to abut the inner surface 13 of the mirror housing 11 to close the opening portion 14 of the mirror housing 11.

The top plate 41 can extend inward of the mirror housing 11 from the top end of the side plate 42 in an opposite direction to the inner surface 13 of the mirror housing 11. Accordingly, the extended end of the top plate 41 can be bonded to the extended end of the top plate 31 of the housing 30.

The bottom plate 43 can extend inward of the mirror housing 11 from the bottom end of the side plate 42 in the opposite direction to the inner surface 13 of the mirror housing 11. Accordingly, the extended end of the bottom plate 43 can be bonded to the extended end of the inclined plate 33 of the housing 30.

The fit convex portion 44 can be provided on an outer surface of the side plate 42 so as to be convex. The vertical position of the fit convex portion 44 can be matched to the vertical position of the reflecting surface 34 and the opening portion 14. The fit convex portion 44 can be fit into the opening portion 14 from inside of the mirror housing 11.

As shown in FIGS. 5 and 6, the light source 70 can be a semiconductor light emitting device such as a light emitting diode. The light source 70 can be attached to the box 50. Specifically, a plurality of light sources 70 can be individually mounted onto a substrate 71 and the substrate 71 can be attached to the lower surface of the top plate 31 of the housing 30. Therefore, the light sources 70 can be disposed within the lighting chamber 51 while being shifted above (higher than) the position of the opening portion 14. In the illustrated example, these light sources 70 can be arranged along the longitudinal direction of the top plate 31 of the housing 30. The light source 70 can have an optical axis Ax directed downward in the vehicle height direction so that the light source 70 can emit light downwardly. It should be noted that the optical axis Ax of the light source 70 means the virtual line extending from the light source 70 in a direction in which the light amount is a maximum.

The light guide can include a plurality of light guides 60 and can be disposed below the light source so that the plurality of light guides 60 can be arranged in a direction perpendicular to the optical axes Ax of the light sources 70. The light guides 60 can be connected in the longitudinal direction and integrally attached to the box 50 by means of a holder and the like so that the respective light guides 60 correspond to the light sources 70 one by one. These light guides 60 can be disposed within the lighting chamber 51 while being shifted or displaced above the opening portion 14.

The light guide 60 can convert the light emitted from the light source 70 to surface-shaped emission light (or band-shaped emission light) projected toward the reflecting surface 34.

As shown in FIG. 5, the light guide 60 can include a pair of light guiding portions 61, an incident surface 62, a pair of first reflecting surfaces 63, a plurality of second reflecting surfaces 64, a plurality of steps 65, and light exiting surfaces 66. As shown in FIG. 4, among the plurality of light guides 60, the rearmost light guide 60A can have a plurality of light exiting surfaces 66 and the remaining light guides 60B can each have a pair of light exiting surfaces 66.

As shown in FIG. 5, the combination of two light guiding portions 61 can form an inverted Y-letter shape. Namely, the base end portions of the two light guiding portions 61 can be connected to each other, so that the connected portion of these light guiding portions 61 is convex to the upper direction (opposite to the optical axial Ax direction). In other words, the connected portion of these light guiding portions 61 can cross the optical axis Ax and be branched into these light guiding portions 61 extending in the radial direction of the optical axis Ax.

The incident surface 62 can be formed on the upper surface of the connecting portion between the light guiding portions 61. Specifically, the incident surface 62 can be formed on a projected end surface of the convex connecting portion between the light guiding portions 61. The incident surface 62 can be composed of a rotationally symmetric surface of a convex shape protruding upward around the optical axis Ax as a rotary symmetric axis and have a focal point. The incident surface 62 can face towards the light source 70 so that the focal point of the surface 62 is located at or near (i.e., substantially at) the light source 70. The incident surface 62 can be configured such that the light emitted from the light source 70 can be refracted when it is incident on the surface 62 and enters the connecting portion of the light guiding portions 61 while the light can be directed along the optical axis Ax (adjusting the directivity of light along the optical axis Ax).

The pair of first reflecting surfaces 63 can be formed on the lower surfaces of the connecting portion of the light guiding portion 61 opposite to the incident surface 62. Specifically, one of the first reflecting surfaces 63 can be formed on the lower surface of the base end portion of the one light guiding portion 61 while the other first reflecting surface 63 can be formed on the lower surface of the base end portion of the other light guiding portion 61. In this configuration, a V shaped notch area can be formed between the first reflecting surfaces 63 on the lower surfaces of the connecting portion of the light guiding portions 61. Namely, the first reflecting surfaces 63 can be inclined by 45 degrees radially and outwardly with respect to the optical axis Ax. In this configuration, the first reflecting surfaces 63 can reflect the light entering through the incident surface 62 toward the respective light guiding portions 61 so as to divide the light radially and outwardly with respect to the optical axis Ax.

The upper surfaces of the two light guiding portions 61 can be formed in a step shape at respective areas that are more outwardly located than the incident surface 62 (both radially and outwardly) with respect to the optical axis Ax. Namely, the second reflecting surfaces 64 and the steps 65 can be formed on the upper surfaces of the two light guiding portions 61 at an area that is outward of the location where the incident surface 62 is formed. Specifically, the steps 65 can be formed perpendicular to the optical axis Ax in a stepwise manner so that the step 65 farther from the optical axis Ax in a radial direction may be located further away from the light source 70 in a forward direction component. The second reflecting surfaces 64 can be arranged between the adjacent steps 65 so that the second reflecting surfaces 64 and the steps 65 are arranged alternately in the radial direction. The second reflecting surfaces 64 can be provided in a stepwise manner so that the second reflecting surface 65 farther from the optical axis Ax in a radial direction may be located further away from the light source 70 in the forward direction component. Specifically, the second reflecting surfaces 64 can be formed parallel to the corresponding first reflecting surfaces 63 and inclined by 45 degrees with respect to the step 65 in an optical axis Ax direction. The second reflecting surfaces 64 can be configured to reflect light having been previously reflected by the first reflecting surfaces 63 and traveling within the light guiding portions 61 outwardly with respect to the optical axis Ax, toward the direction along the optical axis Ax.

Next, the rearmost light guide 60A among the plurality of light guides 60 will be described with regard to the light exiting surfaces 66 thereof. As shown in FIG. 4, the light exiting surfaces 66 can be formed on the lower surfaces of the light guiding portions 61 at a more outward location than the area where the first reflecting surfaces 63 are formed so that the surfaces 66 can be opposite to the second reflecting surfaces 64. These light exiting surfaces 66 can be arranged in sequence radially and outwardly with respect to the optical axis Ax. Further, the light exiting surfaces 66 can be inclined with respect to the plane perpendicular to the optical axis Ax toward the optical axis Ax. The light exiting surfaces 66 can face towards the reflecting surface 34 of the inner face of the housing 30. Accordingly, the light, after having been reflected by the second reflecting surfaces 64, can exit through the light exiting surfaces 66 while also being refracted by the light exiting surfaces 66 towards the reflecting surface 34.

Next, remaining light guides 60B other than the light guide 60A will be described with regard to the light exiting surfaces 66 thereof. As shown in FIG. 5, the light exiting surfaces 66 can be formed on the lower surfaces of the light guiding portions 61 at a more outward location than the area where the first reflecting surfaces 63 are formed so that the surfaces 66 can be opposite to the second reflecting surfaces 64. The light exiting surfaces 66 can be surfaces perpendicular to the optical axis Ax. The light exiting surfaces 66 can face towards the reflecting surface 34 of the inner face of the housing 30.

In the light guide 60 with the above configuration, the light emitted from the light source 70 can be incident on the incident surface 62 to enter the light guiding portions 61 while being collimated by the incident surface 62 in the optical axis direction Ax. The light travelling from the incident surface 62 in the optical axis Ax direction can be divided by the first reflecting surfaces 63 radially and outwardly with respect to the optical axis Ax. The light travelling from the first reflecting surface 63 in the radial direction with respect to the optical axis Ax can be reflected within the light guide by the second reflecting surfaces 64 in the optical axis Ax direction. Then, in the rearmost light guide 60A, the light reflected by the second reflecting surfaces 64 and traveling in the optical axis Ax direction can be refracted by the light exiting surfaces 66 and projected through the same to the reflecting surface 34. On the other hand, in the light guide 60A, the light reflected by the second reflecting surfaces 64 and traveling in the optical axis Ax direction can be projected through the light exiting surfaces 66 to the reflecting surface 34.

Then, the light can be reflected by the reflecting surface 34 to the opening portion 14 of the mirror housing 11. The light traveling to the opening portion 14 can pass through the outer lens 40 and exit to the outside of the mirror housing 11. Specifically, as shown in FIG. 6, the light traveling to the opening portion 14 can pass through the side plate 42 and the fit convex portion 44 of the outer lens 40 and exit to the outside of the mirror housing 11.

In order for the light exiting through the opening portion 14 to become diffused light with low directivity, the vehicle signal light 20 can be configured as the following items (1) to (3).

(1) Reflecting Surface 34: Diffusion and Reflection

The reflecting surface 34 can be formed by subjecting the upper surface of the inclined plate 33 to a texturing process, matte process (frosting process), dull finishing (for example, dull finished white coating), or other diffusion/reflection surface process. It is unnecessary that the reflecting surface 34 is a mirror-finished flat surface. Accordingly, the reflecting surface 34 can diffuse and reflect the light from the light guide 60 to be surface-shaped emission light (light exiting through the light exiting surface 66) toward the opening portion 14. Thus, the light diffused and reflected by the reflecting surface 34 can be indirect light.

(2) Light Guide 60: Diffusion and Reflection

The light guide 60 can convert the entering light that is emitted from the light source 70 to be diffused emission light or surface-shaped (band-shaped) emission light directed toward the reflecting surface 34. Specifically, the light exiting surface 66 can be subjected to a texturing process, micro-lens array process, or other diffusion process so that the light reflected by the second reflecting surfaces 64 can be diffused by the light exiting surface 66.

(3) Outer Lens 40: Diffusion and Transmission

The outer lens 40 can be provided with a light diffusion agent or fine pores dispersed on the inner surface (mainly the side plate 42, the fit convex portion 44 and the like) or the surface of the outer lens 40 (mainly, the inner surface of the side plate 42 or the projected end face of the fit convex portion 44) can be subjected to a texturing process, fine unevenness process, or other optical diffusion process. In this manner, the outer lens 40 can diffuse light reflected by the reflecting surface 34 and allow the light to pass therethrough.

Any one, two or all of the above configurations according to items (1) to (3) can be employed according to the required or desired specification or application.

Further, if the reflecting surface 34 is not a diffusing and reflecting surface in accordance with item (1) above, the reflecting surface 34 may not be a mirror-finished flat surface. In this case, both configurations according to the above items (2) and (3) can be employed.

If the light guides 60 and the light exiting surfaces 66 are not configured as a diffusing exit surface in accordance with above item (2), the light exiting surfaces 66 may each be a flat surface or a surface having lens cut or prism cut according to a desired illumination mode. Furthermore, in this case, any of or both of the above items (1) and (3) can be employed.

If the outer lens 40 is not a diffusion/transmission body in accordance with above item (3), the outer lens 40 can be configured to simply allow the light reflected by the reflecting surface 34 to pass therethrough without optical change. Furthermore, in this case, any of or both of the above items (2) and (3) can be employed.

The following action/advantageous effects can be attained with the above exemplary embodiment(s).

(a) Since the light guides 60 can convert the light emitted from the light sources 70 and incident on the respective incident surfaces 62 to surface-shaped emission light, when the light sources 70 are turned on, the projected end surfaces (light exiting surfaces) of the fit convex portions 44 can be observed with uniform brightness. Thus, there is little luminance unevenness at the projected end surfaces (light exiting surfaces) of the fit convex portions 44, resulting in suppression of luminance variation as a whole lighting unit.

(b) In general, the light source 70 may be a point light source and have a certain directivity of light along the optical axis Ax. However, when any of or all of the above items (1) to (3) are employed, the light projected outwardly from the opening portion 14 can have less directivity and may become diffused light. Namely, the projected end surfaces (light exiting surfaces) of the fit convex portions 44 can be observed with uniform illuminance even when an observer views the vehicle signal light 20 from any points therearound. Thus, one can observe the vehicle signal light 20 without brightness unevenness, resulting in suppression of luminance variation as a whole in the lighting unit.

(c) When the light sources 70 are turned off, the images of the light sources 70 that can appear at the projected end surfaces (light exiting surfaces) of the fit convex portions 44 may be blurred to a substantial degree. Namely, when an observer views the projected end surfaces (light exiting surfaces) of the fit convex portions 44 of the vehicle signal light 20 from any points therearound, he/she cannot visually recognize the shapes of the light sources 70 because of the configurations of any of the above items (1) to (3).

(d) If any of or all of the above items (1) and (3) are employed, when an observer views the fit convex portions 44 from any points therearound, he/she cannot visually recognize the light guides 60. This configuration can improve the aesthetic appearance of the vehicle signal light 20.

(e) Since the light guides 60 and the light sources 70 can be disposed above (higher than) the position of the opening portion 14 of the mirror housing 11, an observer cannot directly recognize the light guides 60 and the light sources 70 even when the outer lens 40 is configured to allow light to simply pass therethrough without any optical change. This configuration can improve the aesthetic appearance of the vehicle signal light 20.

(f) In the vehicle signal light, the light guides 60 and the light sources 70 can be disposed above (higher than) the position of the opening portion 14 of the mirror housing 11, the optical axes Ax of the light sources 70 can be directed downward, and the reflecting surface 34 can be configured to reflect light to a direction perpendicular to the optical axes Ax. This configuration can ensure the desired optical path length from the light sources 70 to the respective projected end surfaces (light exiting surfaces) of the fit convex portions 44 while the vehicle signal light 20 can be made thin (the length in the arrow direction in FIG. 6). The exemplary embodiments of the presently disclosed subject matter should not be limited to those described here, but can be modified without departing from the scope of the presently disclosed subject matter.

Figure 7:
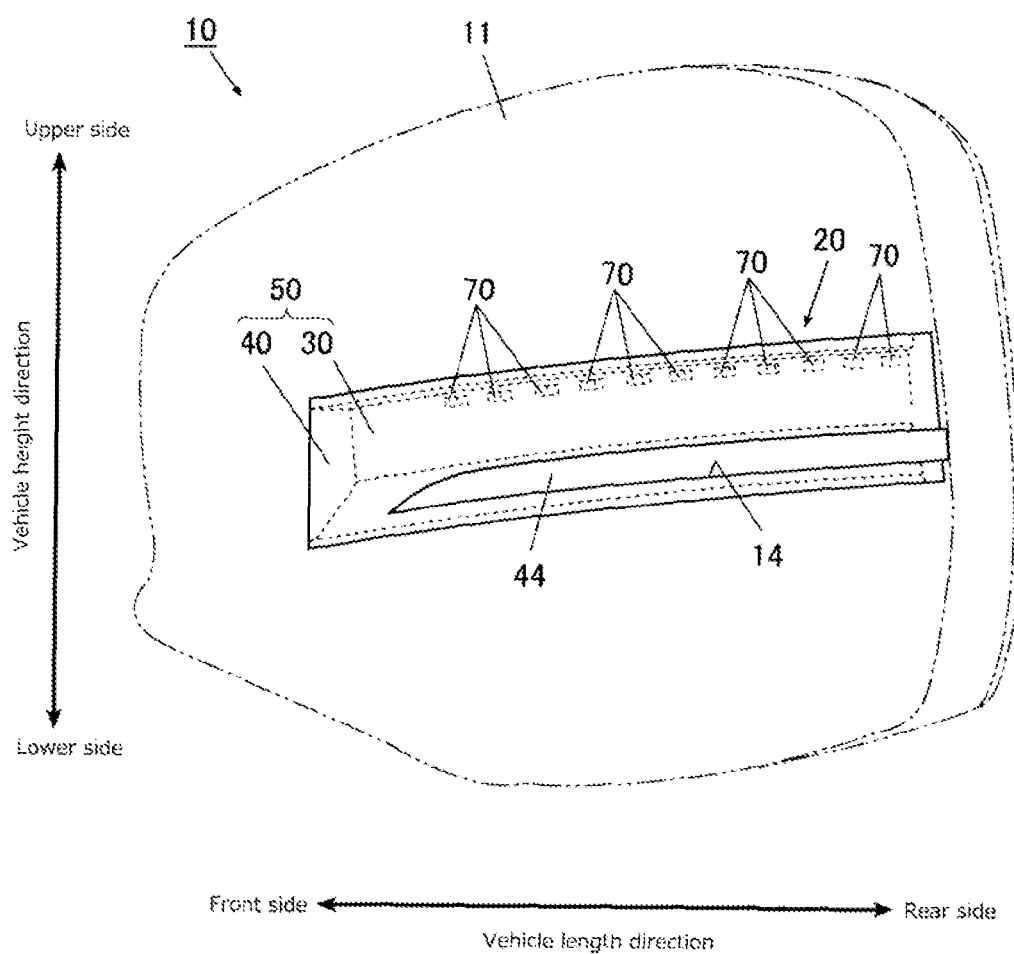
FIG. 7 is a side view of a sideview mirror to which a vehicle signal light according to a modified exemplary embodiment is attached.

For example, as shown in FIG. 7, the light guides may be omitted. In this case, the number of the light sources 70 can be increased and these light sources 70 can be arranged in line along the longitudinal direction of the top plate 31 of the housing 30 without a gap therebetween. This configuration can provide a band-shaped light-emitting body with the combination of these light sources 70. Further, if the light guides are omitted, the reflecting surface 34 can be configured as a diffusing and reflecting surface according to the above item (1) and/or the outer lens 40 can be a diffusion/transmission body according to the above item (3).

Furthermore, the vehicle signal light 20 can be mounted in the mirror housing 11 in a vertically invert posture with respect to the above-mentioned posture. In this case, the other components such as the shape of the opening portion 14 and the like can be configured in a vertically invert posture. Also in this case, the light sources 70, the light guides 60, and the like can be disposed while shifted downward in the vehicle height direction with respect to the position of the opening portion 14.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit for projecting light outwardly through an opening portion formed in a mirror housing of a sideview mirror along a vehicle length direction, the vehicle lighting unit comprising:

a housing having a light-blocking property and configured to extend along the opening portion of the mirror housing inside the mirror housing and to open toward the opening portion of the mirror housing when the unit is connected to the mirror housing;

an outer lens assembled with the housing and configured to be located inside the mirror housing so as to close the opening of the housing and the opening portion of the mirror housing when the unit is connected to the mirror housing, the outer lens and the housing defining a lighting chamber, the outer lens having a width along a vertical direction larger than a width of the opening of the mirror housing alone the vertical direction;

a light source disposed in the lighting chamber at a position shifted from a position of the opening portion of the mirror housing when the unit is connected to the mirror housing in one direction of the vertical direction and having an optical axis extending in the other direction of the vertical direction; and a light guide disposed in the lighting chamber while shifted from the position of the opening portion of the mirror housing toward the light source so as to convert light emitted from the light source to surface-shaped emission light through a light exiting surface of the light guide in a direction of the optical axis, wherein the light source and the light guide are configured with respect to the housing such that the light source and the light guide cannot be seen through the opening portion of the mirror housing from a front side of the mirror housing when the unit is connected to the mirror housing.

2. The vehicle lighting unit according to claim 1, wherein at least a portion of an inner surface of the housing that faces towards the light exiting surface of the light guide includes a diffusing and reflecting surface configured to diffuse and reflect light projected from the light exiting surface of the light guide toward the outer lens and the opening portion of the mirror housing when the unit is connected to the mirror housing.

3. The vehicle lighting unit according to claim 1, wherein the light exiting surface of the light guide is configured to project light emitted from the light source to an inner surface of the housing so that the light is diffused, and at least a portion of the inner surface of the housing that faces towards the light exiting surface of the light guide includes a reflecting surface configured to at least one of diffuse and reflect light projected from the light exiting surface of the light guide toward the outer lens and the opening portion of the mirror housing when the unit is connected to the mirror housing.

4. The vehicle lighting unit according to claim 1, wherein at least a portion of an inner surface of the housing that faces towards the light exiting surface of the light guide includes a reflecting surface configured to at least one of diffuse and reflect light projected from the light exiting surface of the light guide toward the outer lens and the opening portion of the mirror housing when the unit is connected to the mirror housing, and the outer lens is configured to diffuse the light that is at least one of diffused and reflected by the reflecting surface and to allow the light to pass therethrough.

5. A vehicle lighting unit for projecting light outwardly through an opening portion formed in a mirror housing of a sideview mirror along a vehicle length direction, the vehicle lighting unit comprising:

a housing having a light-blocking property and configured to extend along the opening portion of the mirror housing inside the mirror housing and to open toward the opening portion of the mirror housing when the unit is connected to the mirror housing;

an outer lens assembled with the housing and configured to be located inside the mirror housing so as to close the opening of the housing and the opening portion of the mirror housing when the unit is connected to the mirror housing, the outer lens and the housing defining a lighting chamber, the outer lens having a width along a vertical direction larger than a width of the opening of the mirror housing alone the vertical direction; and a light source disposed in the lighting chamber at a position shifted from the opening portion of the mirror housing in one direction of the vertical direction when the unit is connected to the mirror housing and having an optical axis in another direction of the vertical direction, wherein the light source is configured with respect to the housing such that the light source cannot be seen through the opening portion of the mirror housing from a front side thereof when the unit is connected to the mirror housing.

6. The vehicle lighting unit according to claim 5, wherein at least a portion of an inner surface of the housing where the optical axis of the light source intersects includes a diffusing and reflecting surface configured to diffuse and reflect light projected from the light source in a direction of the optical axis of the light source toward the outer lens and the opening portion of the mirror housing when the unit is connected to the mirror housing.

7. The vehicle lighting unit according to claim 5, wherein at least a portion of an inner surface of the housing where the optical axis of the light source intersect includes a reflecting surface configured to at least one of diffuse and reflect light projected from the light source in a direction of the optical axis of the light source toward the outer lens and the opening portion of the mirror housing when the unit is connected to the mirror housing, and the outer lens is configured to diffuse the light that is at least one of diffused and reflected by the reflecting surface and to allow the light to pass therethrough.

8. The vehicle lighting unit according to claim 1, wherein the vehicle lighting unit is a vehicle signal light.

9. The vehicle lighting unit according to claim 2, wherein the vehicle lighting unit is a vehicle signal light.

10. The vehicle lighting unit according to claim 3, wherein the vehicle lighting unit is a vehicle signal light.

11. The vehicle lighting unit according to claim 4, wherein the vehicle lighting unit is a vehicle signal light.

12. The vehicle lighting unit according to claim 5, wherein the vehicle lighting unit is a vehicle signal light.

13. The vehicle lighting unit according to claim 6, wherein the vehicle lighting unit is a vehicle signal light.

14. The vehicle lighting unit according to claim 7, wherein the vehicle lighting unit is a vehicle signal light.

15. The vehicle lighting unit according to claim 5, wherein the vehicle lighting unit is configured to project light outwardly through the opening portion formed in the mirror housing of the sideview mirror and near an outer side of the sideview mirror in a vehicle width direction.

16. The vehicle lighting unit according to claim 5, wherein the outer lens includes an elongate projection on a front surface of the outer lens that is configured to mate with the opening in the mirror housing when the unit is mounted to the mirror housing such that the elongate projection forms the only area from which light emitted from the light source escapes from the mirror housing when the unit is mounted to the mirror housing, and the light source is spaced in a vertical direction from the elongate projection such that the light source cannot be seen through the elongate projection when the unit is mounted to the mirror housing.

17. The vehicle lighting unit according to claim 1, wherein the vehicle lighting unit is configured to project light outwardly through the opening portion formed in the mirror housing of the sideview mirror and near an outer side of the sideview mirror in a vehicle width direction.

18. The vehicle lighting unit according to claim 1, wherein the outer lens includes an elongate projection on a front surface of the outer lens that is configured to mate with the opening in the mirror housing when the unit is mounted to the mirror housing such that the elongate projection forms the only area from which light emitted from the light source escapes from the mirror housing when the unit is mounted to the mirror housing, and the light source is spaced in a vertical direction from the elongate projection such that the light source cannot be seen through the elongate projection when the unit is mounted to the mirror housing.

* * * * *